July 12, 1960  E. C. ROLLINS  2,944,611
BEET HARVESTER AND CLEANER
Filed April 7, 1958  4 Sheets-Sheet 1

INVENTOR.
EUGENE C. ROLLINS
BY Mellin and Hanson
ATTORNEYS

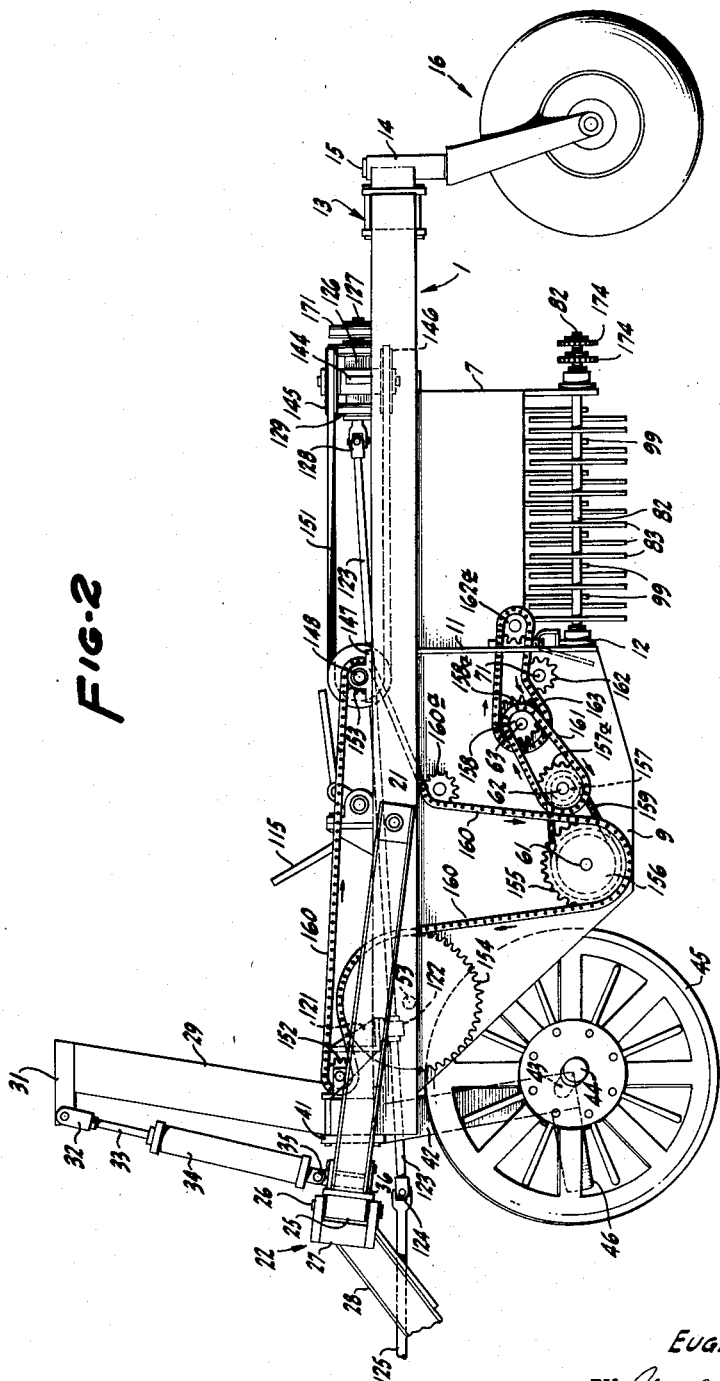

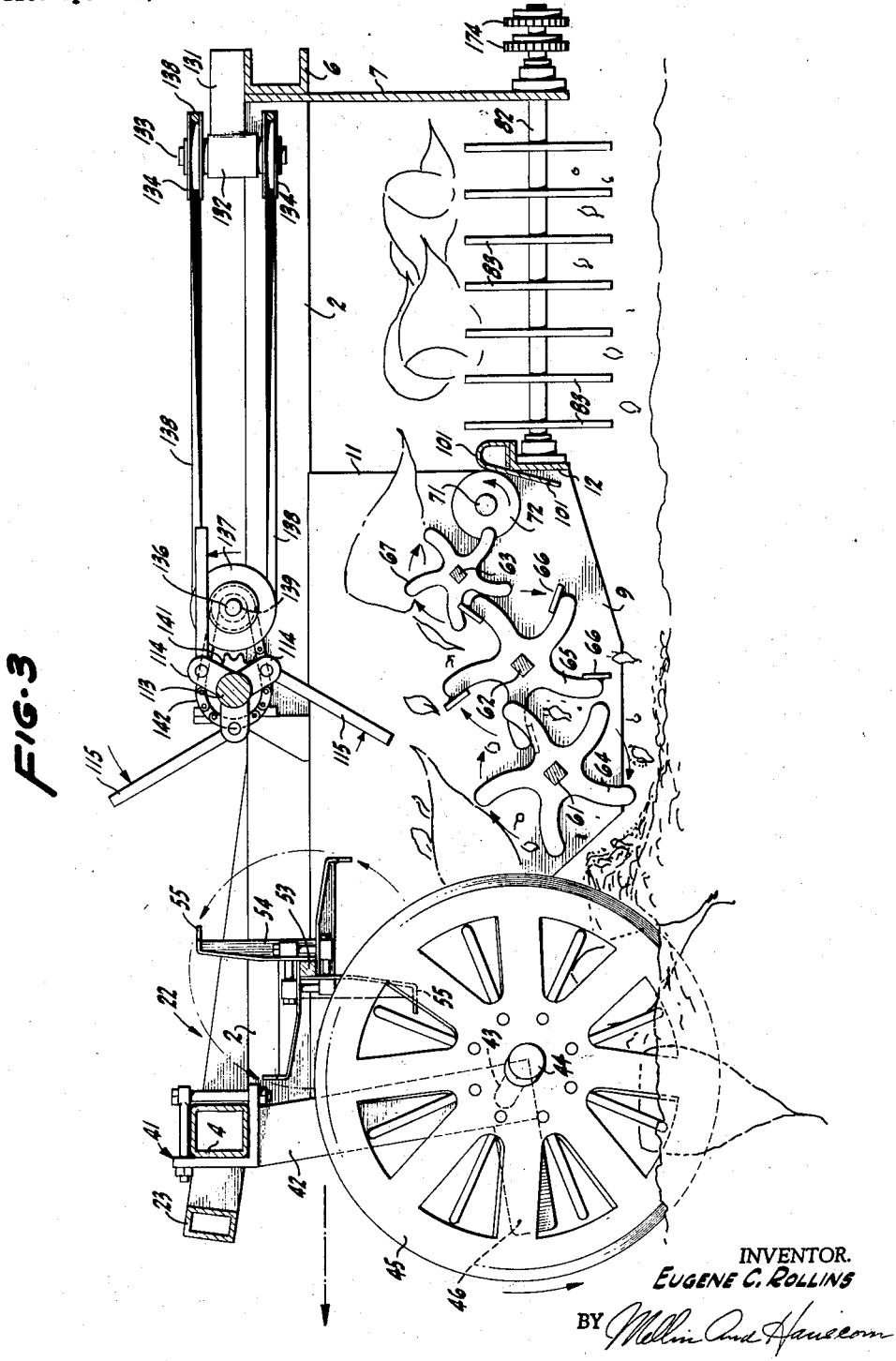

July 12, 1960
E. C. ROLLINS
2,944,611
BEET HARVESTER AND CLEANER
Filed April 7, 1958
4 Sheets-Sheet 4
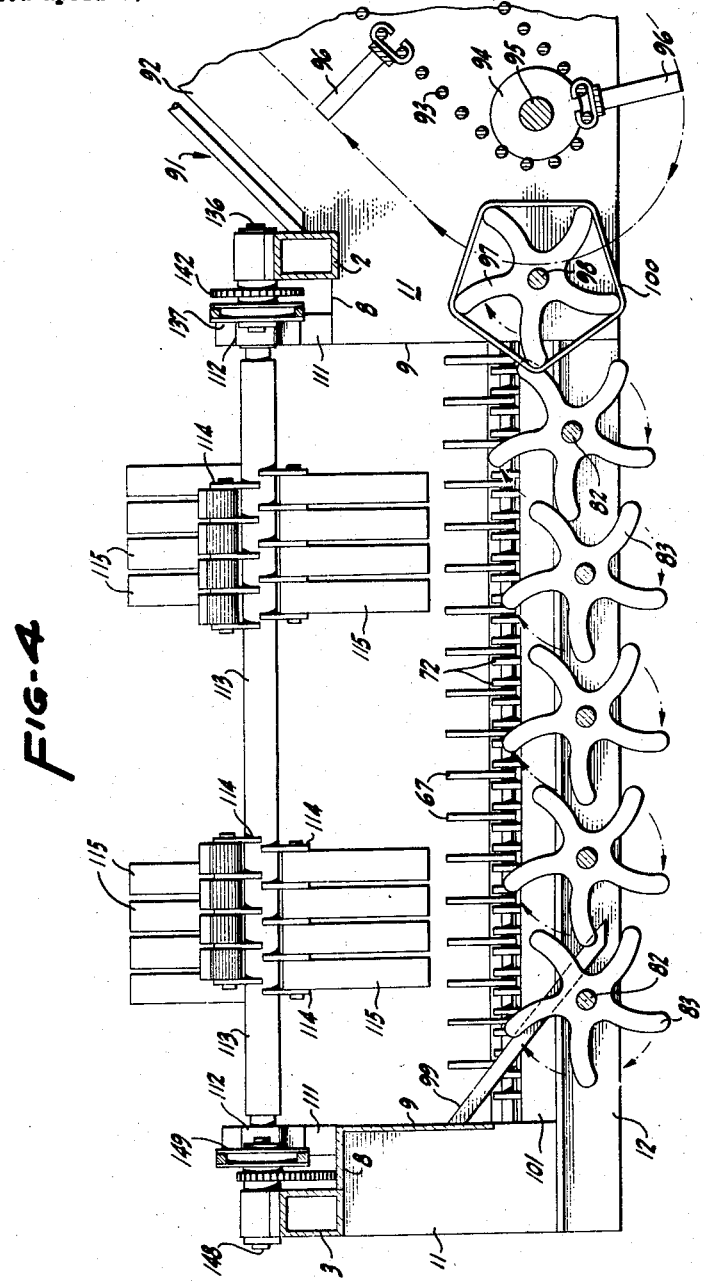
INVENTOR.
EUGENE C. ROLLINS
BY Mellin and Hanscom
ATTORNEYS

United States Patent Office

2,944,611
Patented July 12, 1960

2,944,611

BEET HARVESTER AND CLEANER

Eugene C. Rollins, % Gen. Machine Co., P.O. Box 1330, Ogden, Utah

Filed Apr. 7, 1958, Ser. No. 726,732

3 Claims. (Cl. 171—58)

This invention relates to and in general has for its object the provision of a beet harvester and cleaner.

In beet harvesting machines which lift the beets from the soil by means such as plow shoes or cooperating lifting wheels it is necessary to run the dug beets across some sort of a cleaning screen for the purpose of cleaning them of as much soil, mud, clods, and trash as possible before they are delivered from the harvesting machine to a truck or other conveyance for delivery to the sugar factory for processing. The beet dumps which receive the beets from the fields also contain cleaning systems to further clean the beets, but if too dirty a load is delivered to them the cleaning screens become overloaded and clogged with mud and trash. As a consequence of this, dirty beets are delivered to the storage piles and subsequently to the processing factory where the dirt, clods, and trash are detrimental to the processing machinery.

More specifically, the object of this invention is the provision in a beet wheel type of beet harvester of a transfer and cleaning system for transferring beets and debris from the beet wheels to a transverse conveyor system and for cleaning said beets, including forward, intermediate, and rear parallel sets of rotary spiders, the spiders of each set of spiders being coaxial, transversely spaced, and interdigitated with the spiders of the adjacent set of spiders, each spider including a plurality of outwardly extending, coplanar fingers, the fingers of the spiders of the intermediate set of spiders being provided with pads arranged to wipe the fingers of the adjacent sets of spiders, and means being provided for rotating the intermediate set of spiders at a speed different than the speed of rotation of the forward and rear sets of spiders.

Another object of this invention is the provision of a beet harvester of the character above described wherein said rear set of spiders is followed by a parallel set of coaxial, transversely spaced discs interdigitated with the spiders of said rear set of spiders, and wherein means is provided for rotating said discs in a direction reverse to the direction of rotation of said spiders.

A further object of this invention is the provision of a beet harvester of the character above described wherein a set of rotating flails is mounted rearwardly of said beet wheels and above said forward set of spiders to thereby spank beets delivered from said beet wheels and to urge them rearwardly of the harvester.

Still another object of this invention is the provision of a harvester of the character above described wherein a transversely extending set of rotating blades is mounted rearwardly of said beet wheels in interdigitating relationship therewith for transferring beets from said beet wheels to said forward set of spiders and in the path of rotation of said flails.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings:

Fig. 2 is a side elevation of the harvester illustrated in Fig. 1.

Fig. 3 is a fragmentary longitudinal vertical section taken on the section line 3—3 of Fig. 1.

Fig. 4 is a fragmentary transverse vertical section taken on the section line 4—4 of Fig. 1 and with portions thereof broken away to better illustrate the construction of the machine.

Frame

Figure 1:
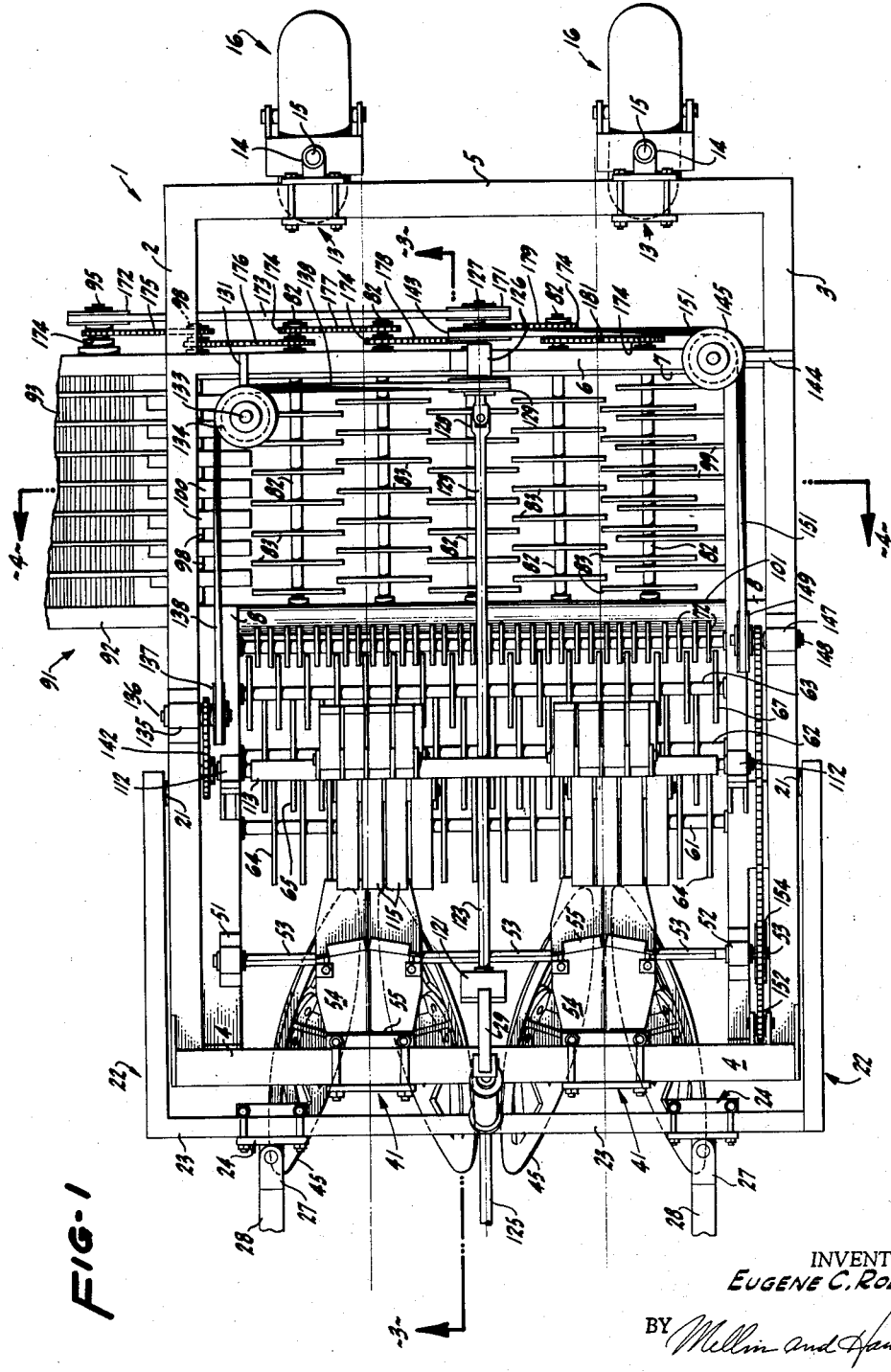
Fig. 1 is a top plan view of a beet harvester and cleaner embodying the objects of my invention.

The harvester illustrated in these various figures comprises a fabricated rectangular steel frame generally designated by the reference numeral 1, including opposed longitudinal side beams 2 and 3 of box configuration in section, a front end crossbeam 4 of box configuration in cross section, and a rear end box beam 5, all welded into a rigid coplanar structure. Bridging the side beams 2 and 3 intermediate their ends, and welded thereto, is a cross channel beam 6 (Fig. 3). Secured to the cross beam 6 and depending therefrom is plate 7 bridging the side beams 2 and 3. Welded to the inner lower corner of each of the side beams 2 and 3, and extending inwardly thereof, is a horizontal plate 8 (Fig. 4), and rigidly secured to and depending from the inner end of each plate 8 is a vertical, longitudinally extending plate 9. Fastened over the rear coplanar ends of each set of plates 8 and 9 is a vertical, transversely extending plate 11, and bridging and welded to the lower ends of the opposed plates 11 is a horizontal, transversely extending angle beam 12 (Fig. 3).

Rear end ground engaging castors

Slidably mounted on the rear end beam 5 (Figs. 1 and 2) is a pair of clamps 13, and formed integral with each clamp 13 is a pintle bearing 14. Journaled in each of the bearings 14 is a pintle 15, and formed integral with each pintle is a ground engaging castor generally designated by the reference numeral 16. As a result of this structure, the castors can be clamped in any desired position along the beam 5 over a pair of adjacent furrows to be traversed.

Front end suspension

Straddling the front end of the frame 1 and pivoted thereto by pins 21 is a yoke generally designated by the reference numeral 22 and including a cross beam 23.

Mounted on the crossbeam 23 for adjustment transversely thereof is a pair of clamps 24, and formed integrally with each clamp is a sleeve bearing 25. Swiveled to each sleeve bearing by a pin 26 is a swivel 27, and welded to each swivel is a forwardly declining hitch bar 28 (Figs. 1 and 2). As a result of this construction, the front end of the harvester can be at approximately the desired elevation to a draft truck.

Welded to the front beam end 3, approximately centrally thereof, is an upstanding mast 29 provided at its upper end with an overhanging bracket 31. Swiveled to the bracket 31 by a yoke 32 is the upper end of a piston rod 33, the rod 33, although not shown, being provided at its lower end with a piston operatively associated with a cylinder 34. Formed on the lower end of the cylinder is a yoke 35 for pivoting the cylinder to a clamp 36 adjustably mounted on the yoke cross beam 23. Although not shown, the cylinder is arranged to be connected in any well known manner to a source of hydraulic pressure controlled from the draft truck. As a result of this construction, the elevation of the front end of the harvester relative to the draft truck can be adjusted at will.

Harvesting wheels assembly

It should here be preliminarily noted that although my harvester can be constructed so as to simultaneously harvest any desired number of rows of beets, the harvester here disclosed is designed to harvest two rows of beets.

To this end there is mounted on the frame front end beam 4 for transverse adjustment thereon, a pair of clamps 41, and welded to the lower side of each of these clamps is bracket 42 box-shaped in cross section (Figs. 2 and 3). Provided on the lower end of each bracket 42 are opposed, outwardly declining sleeve bearings 43, and journaled therein are stub shafts 44 to which inclined beet wheels 45 are secured. Since the beet wheels 45 are of known construction and operation it is deemed unnecessary to further describe them here. Suffice it to say that each pair of wheels straddles a beet row, digs into the ground, and by wedge action lifts the beets and a certain amount of dirt and debris counterclockwise as viewed in Fig. 2, all in accordance with known practice.

Bolted to the front face of each bracket 42 is a forwardly extending fork 46 paralleling the contour of each pair of wheels and serving as a wiper for cleaning the descending inner face of each wheel during the rotation thereof (Fig. 2).

Beet transfer pin wheel assembly

Extending between the main frame side beams 2 and 3 and journaled in bearings 51 and 52 mounted thereon rearwardly of the brackets 42 is a square shaft 53. Clamped to the shaft 53 between each pair of beet wheels, pinwheel fashion, is a set of four flat beet transfer blades 54 provided with peripherally extending flanges 55. As best indicated in Fig. 3, this assembly is arranged to rotate counterclockwise. As a result of this construction, the blades 54 serve to pick up beets and debris lodged in each pair of beet wheels and to carry them to a point adjacent the pin wheel assembly.

Star wheel transfer mechanism

Extending between and journaled in the two transversely opposed plates 9 is a set of three shafts 61, 62, and 63. Fixed to the shaft 61 is a front set of transversely spaced transfer star wheels or spiders 64. Similarly mounted on the shaft 62 is an intermediate set of transversely spaced star wheels 65, these latter wheels being interdigitated with the star wheels 64. The star wheels 65 can be identical with the star wheels 64 with the important exception that each finger of the star wheels 65 is provided at its end with a wiper pad or plate 66.

Fastened to the shaft 63 is a third rear set of smaller star wheels 67 arranged for interdigitation with the intermediate set of star wheels 65. As will presently be described, each of these three sets of star wheels is arranged to rotate clockwise and in so doing to cause the beets and debris transferred thereto by the blades 54 to progress to the rear of the machine. During this process the beets are freed of dirt, this dirt dropping by gravity between the star wheels to the ground.

Also extending between and journaled in the opposed plates 9 is a shaft 71, and mounted thereon is a set of transversely spaced discs 72 interdigitated with the rear set of star wheels 67 and serving to maintain this latter set of star wheels clean. The discs 72, like the star wheels, are arranged to rotate counterclockwise by means which will presently be described.

Transverse conveyor assembly

Extending between and journaled in plate 7 and angle beam 12 is a plurality of transversely spaced, longitudinally extending shafts 82, and mounted on each of these shafts is a set of longitudinally spaced transfer star wheels 83. From Fig. 1 it will be noted that the star wheels of each set of star wheels are interdigitated with the wheels of the adjacent set or sets of star wheels and that in effect these various sets of star wheels form a continuous conveyor for conveying beets delivered to it by the discs 72, transversely of the machine to one side thereof (upper as viewed in Fig. 1).

Elevator assembly

From the transverse conveyor assembly just described the beets are delivered to an elevator generally designated by the reference numeral 91, and of known construction. Generally, the elevator consists of an inclined rectangular frame 92 for supporting and endless rod link belt 93. Both ends of the belt 93 are reeved about rollers 94, the lower roller being shown in Fig. 4 as mounted on a shaft 95. In accordance with known practice, conveying pins 96 secured to and extending outwardly from the rod conveyor 93 are provided for assisting in supporting the beets and carrying them upwardly over the side of the harvester to a truck (not shown).

The transfer of the beets from the last set of star wheels to the elevator generally described above is effected by an end set of longitudinally spaced star wheels 97 mounted on a shaft 98, this shaft being journaled in the plate 7 and beam 12. Surrounding each star wheel 97 is a belt or band 100, and here it shosuld be observed that the wheels 97 are staggered relative to the wheels 83 of the last set of transverse star wheels.

To prevent beets and leaves from falling between the side beam 3 and the first set of wheels 83, inwardly extending fingers 99 can be secured to the frame in interdigitating relationshsip with the wheels 83 of the first set of wheels.

To protect the bearings of the front ends of the shafts 82 against dirt it is preferable to mount a shield 101 on the beam 12 over these bearings.

Beet flail assembly

Secured to and extending upwardly from the plates 8 on either side of the machine are brackets 111, and mounted thereon are bearings 112. Extending across the machine and journaled in the bearings 112 is a shaft 113. Mounted on the shaft 113 is a plurality of pairs of radially extending lugs 114, and pivoted to these lugs are rubber fingers or flails 115. From Fig. 3 it will be noted that the lugs 114 are symmetrically arranged, three such sets being shown, and from Fig. 1 it will be seen that each set of lugs is transversely staggered relative to its adjacent set. Also, from Fig. 1 it will be seen that there are two groups of flails such as above described, one group being in longitudinal alignment with one pair of beet wheels, and the other group of flails being in longitudinal alignment with the other pair of beet wheels. Also, from Fig. 3 it is to be noted that the flail assembly is located rearwardly of the rotating transfer plates 54 in a position such that flails 115 during their counterclockwise rotation will spank the beets and leaves as the latter are being carried downwardly by the plates 54 and rearwardly by the star wheels 64, 65, and 67. This action is highly desirable to aid in progressively freeing dirt from the beets and leaves. Since the fingers or flails 115 are pivoted to the lugs 114, they will give upon hitting a beet and pass over it without doing injury to the beet.

Drive assembly

Supported from a bracket 121 (Fig. 2) and mounted on the harvester frame is a bearing 122. Journaled in the bearing 122 is a drive shaft 123 having a universal connection 124 at its front end with a power take-off shaft 125. The power take-off shaft 125 is arranged to be driven from a power unit located on the draft truck (not shown).

Mounted on the beam 6 (Fig. 1) in axial alignment with the shaft is a bearing 126, and journaled therein is a stub shaft 127. Operatively mounted between the forward end of the shaft 127 and the rear end of the drive shaft 123 is a universal connection 128. Keyed to the shaft 123 adjacent its forward end is a pulley wheel 129. Welded to the cross beam 6 (Fig. 3) is a forwardly extending bracket 131, and provided on the forward end thereof is a vertical sleeve bearing 132. Journaled in the bearing 132 is a stub shaft 133, and keyed to each of its ends is a pulley wheel 134. Fixed to the side beam 2 is a bearing 135, and journaled therein is a stub shaft 136. Keyed to the inner end of the shaft 136 is a pulley wheel 137. Reeved about the pulley wheels 137, 134, and 129 is a drive belt 138. As a result of this construction, rotation of the drive shaft 123 is transmitted to the stub shaft 136 through the drive belt 138.

Fixed to the stub shaft 136 is a sprocket 139 (Fig. 3), and similarly fixed to the flail shaft 113 is a sprocket 141. Reeved about these two sprockets is a sprocket chain 142 operating to drive the flail shaft in response to the rotation of the drive shaft 123.

Keyed to the stub shaft 127 just rearwardly of the bearing 126 is a pulley wheel 143. Welded to the side beam 3 is a bracket 144 (Fig. 1), and journaled in said bracket are upper and lower pulley wheels 145 and 146. Fixed to the side beam 3 forwardly of the bracket 144 is a bearing 147, and journaled therein is a stub shaft 148. Keyed to the inner end of the shaft 148 is a pulley wheel 149. Reeved about the pulley wheels 149, 145, 143, and 166 is a drive belt 151 serving to impart rotation to the stub shaft 148 in response to the rotation of the drive shaft 123 (Figs. 1 and 2).

Journaled in the front end beam 4 is a sprocket 152 aligned with a sprocket 153 keyed to the shaft 148. Keyed to the shaft 53 is a large sprocket 154 (Fig. 2). Keyed to the shaft 61 inwardly of the adjacent plate 9 is a sprocket 155, and journaled in the plate 9 is an idler sprocket 160a. Reeved about the sprockets 155, 154, 152, 160a, and 153 is a drive chain 160 serving to rotate the shaft 53 and 61 in response to the rotation of the stub shaft 148, and therefore in response to the rotation of the drive shaft 123.

Also keyed to the shaft 61 is a sprocket 156. Keyed to the shaft 62 is a pair of side by side sprockets 157 and 157a, and similarly keyed to the shaft 63 is a pair of side by side sprockets 158 and 158a. The rotation of the shaft 61 is imparted to the shaft 62 by a chain 159 reeved about the sprockets 156 and 157, and the rotation of the shaft 62 is imparted to the shaft 63 by a chain 161 reeved about the sprockets 157a and 158.

Keyed to the shaft 71 is a sprocket 162, and journaled in the plate 11 is an idler sprocket 162a. Reeved around the sprockets 158a and 162a is a chain 163 passing over the sprocket 162 so as to drive the shaft 71 in a counter-clockwise direction as viewed in Fig. 2. As a result of this construction, it will be seen that each of the shafts 61, 62, and 63 rotate clockwise (as viewed in Fig. 2) in response to the rotation of the drive shaft 123 and that the shaft 71 rotates in the opposite direction. Here it should be recalled that it is the shafts 61, 62, 63, and 71 to which the star wheels or spiders 64, 65, and 67, and the discs 72 are respectively attached. Since the chain 160 passes over the top of the sprocket 154, the shaft 53, and consequently the blades or plates 54, rotate in a counter-clockwise direction as best illustrated in Fig. 3.

The drive for the transverse conveyor system for delivering beets to the elevator is conventional and hardly needs description. Keyed to the rear end of the shaft 127 is a pulley wheel 171, and keyed to the shaft 95 of the elevator assembly is a pulley wheel 172. Reeved about these two pulley wheels is a belt 173, and as a result of this, the shaft 95 is driven in response to the rotation of the drive shaft 123. Keyed to the shaft 98 and to each of the shafts 82, except the lowermost shaft 82, as shown in Fig. 1, is a pair of sprockets 174 (see Fig. 2). Keyed to the lowermost shaft 82 is a single sprocket 174, and keyed to the shaft 95 adjacent the pulley wheel 172 is a similar sprocket 174. Reeved around this latter sprocket and the aligned sprocket 174 mounted on the shaft 98 is a sprocket chain 175. Reeved about each succeeding adjacent pair of sprockets 174 respectively are sprocket chains 176, 177, 178, 179, and 181. In short, the transverse conveyor shafts are driven from the shaft 95 by the interconnection of each shaft with the next succeeding shaft through suitable sprockets and sprocket chains.

*Operation*

The operation of my harvester is as follows: The soil, clods, trash, and beets are deposited on the cleaning star wheels or spiders immediately rearward of the beet wheels 45. The beets are larger than the largest opening in the cleaning start wheels and tend to travel across the rolls. However, due to the fingered shape of the cleaning star wheels or spiders, trash stringers such as beet leaves and weed stalks tend to be caught between the scallops of the fingers and wound around the cleaning spiders. Soil, mud, and small clods tend to drop through the rolls and be eliminated. Large clods tend to be broken and pulverized by the flailing action of the flails 115 and by the kicking action of the cleaning spiders, and are then sifted through the cleaning spiders and thus eliminated. In severe conditions all of the soil and trash will not be eliminated by the spiders, and it is for this reason that the discs 72 have been resorted to. Here it should be noted that these discs rotate in a direction opposite to the direction of rotation of the spiders. The disc 8, discs 72, and the immediately small spider preceding are spaced closely together in such a manner that the openings between the spiders are too small to trap small beets dropping between the rolls; yet trash, small clods, and mud are positively carried through the opening between the rolls and eliminated. It is also an essential part of my invention to provide for cleaning the spiders 65 with the pads or cleats 66 which barely clear the openings between the adjacent spiders. The shafts 61 and 63 should be driven at slightly different speeds than the shaft 62 so that the cleats or pads 66 press around the adjacent shafts in order to clean all the way around the shafts, rather than just on a portion of the circumference as would be the case if the shafts were driven at exactly the same speed or in even small multiples thereof. Were the cleats 66 not provided, shafts 61 and 62 would soon become clogged with mud and trash to the extent that openings between the spiders would become for all practical purposes closed, and consequently the cleaning system would fail.

Another important element of my harvester is the provision of the rotating flails 115 located above the cleaning spiders for effecting further significant cleaning action by forcing the beets, trash, mud, and clods firmly down against the cleaning spiders so that the beets are more effectively scrubbed by the spiders, and the mud, clods, and trash forced into the scallops of the spiders. The flails also tend to effectively scrub the beets of adhering mud and soil, an accomplishment which has not been possible in harvesters in prior art structures resorting to cleaning spiders alone. In friable and sandy soils where severe cleaning action is not necessary, the flail shaft can be disconnected, and thus the flails can be permitted to hang downwardly to act as a retarding curtain to slow the beets and trash in crossing the cleaning rolls, or the flail attachment may be removed altogether. It is a further advantage with my invention that the discs 8 can easily and quickly be changed in direction of rotation to rotate to the rear in the same direction of travel as the spiders 64, 65, and 67, for this is sometimes desirable in rocky soils wherein small rocks would tend to jam between the spider 67 and discs 72 if the latter were in reverse.

I claim:

1. A beet harvester comprising: a frame; a pair of beet wheels mounted on the front end of said frame; forward, intermediate, and rear parallel sets of transversely spaced transfer and cleaning spiders mounted on said frame transversely thereof and rearwardly of said beet wheels, each of said spiders including outwardly extending fingers, the spiders of said intermediate set of spiders being interdigitated with the spiders of said forward and rear sets of spiders; pads mounted on the outer ends of the fingers of the spiders of the intermediate set of spiders; means for rotating said spiders so that the upper sides thereof rotate towards the rear of said harvester; a set of transversely spaced discs journaled in said frame rearwardly of said rear set of spiders, said discs being in interdigitating relationship relative to the spiders of said rear set of spiders; and means for rotating said discs in a direction reverse from the direction of rotation of said spiders.

2. A harvester of the character defined in claim 1, including a set of transversely spaced transfer blades journaled in said frame rearwardly of said beet wheels and above said sets of spiders, said blades being arranged to rotate between the rear sides of said beet wheels and operative to transfer beets from said beet wheels to said spider; and means for rotating said blades in the same direction as the direction of rotation of said beet wheels and spiders.

3. A harvester of the character defined in claim 2, including a set of coaxial, transversely spaced flails journaled in said frame rearwardly of said blades and in the path of beets delivered by said blades to said spiders.

References Cited in the file of this patent

UNITED STATES PATENTS

| | | |
|---|---|---|
| 2,651,155 | Orendorff | Sept. 8, 1953 |
| 2,773,343 | Oppel | Dec. 11, 1956 |